US012543009B2

(12) United States Patent
Van Der Werf

(10) Patent No.: US 12,543,009 B2
(45) Date of Patent: Feb. 3, 2026

(54) DETERMINING AN ACOUSTIC CHARACTERISTIC OF A HEARING INSTRUMENT

(71) Applicant: GN Hearing A/S, Ballerup (DK)

(72) Inventor: Erik Cornelis Diederik Van Der Werf, Eindhoven (NL)

(73) Assignee: GN HEARING A/S, Ballerup (DK)

( * ) Notice: Subject to any disclaimer, the term of this patent is extended or adjusted under 35 U.S.C. 154(b) by 303 days.

(21) Appl. No.: 18/337,426

(22) Filed: Jun. 19, 2023

(65) Prior Publication Data

US 2024/0098427 A1 Mar. 21, 2024

(30) Foreign Application Priority Data

Sep. 15, 2022 (DK) ........................... PA 2022 70448

(51) Int. Cl.
*H04R 25/00* (2006.01)

(52) U.S. Cl.
CPC ......... *H04R 25/305* (2013.01); *H04R 25/505* (2013.01); *H04R 25/604* (2013.01); *H04R 25/609* (2019.05)

(58) Field of Classification Search
CPC .......................... H04R 25/505; H04R 2225/43; H04R 25/407; H04R 25/453; H04R 25/70;
(Continued)

(56) References Cited

U.S. PATENT DOCUMENTS

2002/0176584 A1 11/2002 Kates
2010/0166198 A1 7/2010 Perman
(Continued)

FOREIGN PATENT DOCUMENTS

CN 101771925 7/2010
CN 105491495 4/2016
(Continued)

OTHER PUBLICATIONS

First Technical Exam for Danish Patent Application No. PA 2022 70448 dated Mar. 15, 2023.
Extended European Search Report for EP Patent Appln. No. 23158157.0 dated Aug. 21, 2023.
Search Report for Chinese Patent Appln. No. 202311190351 dated Apr. 25, 2025.
English translation of Search Report for Chinese Patent Appln. No. 202311190351 dated Apr. 25, 2025.
Foreign Office Action dated Jun. 14, 2024 for Chinese patent application No. 202311190351.9.

*Primary Examiner* — Phylesha Dabney
(74) *Attorney, Agent, or Firm* — Vista IP Law Group, LLP

(57) ABSTRACT

Disclosed herein is a method for determining a characteristic of a hearing instrument, the hearing instrument including at least one input transducer operable to provide an input audio signal responsive to sensing sound in the environment of the hearing instrument, a signal processing unit and at least one output transducer, the method comprising: emitting an acoustic probe signal by the output transducer, receiving an input audio signal from the microphone, analyzing the received input audio signal to determine the characteristic of the hearing instrument from an input transducer response to the emitted acoustic probe signal, wherein the method further comprises filtering the received input audio signal to selectively attenuate one or more signal components corresponding to the acoustic probe signal and wherein emitting the acoustic probe signal comprises emitting a combined acoustic output signal comprising the acoustic probe signal and an acoustic hearing instrument signal obtained from the filtered input audio signal.

22 Claims, 10 Drawing Sheets

(58) Field of Classification Search

CPC ............ H04R 2225/55; H04R 2225/41; H04R 25/43; H04R 25/554; H04R 2430/03; H04R 25/552; H04R 2430/01; H04R 25/356; H04R 25/405; H04R 25/50; H04R 25/40; H04R 2225/61; H04R 25/00; H04R 25/558; H04R 25/604; H04R 2225/021; H04R 2225/025; H04R 2430/20; H04R 2225/39; H04R 25/30; H04R 25/606; H04R 1/1016; H04R 2460/03; H04R 3/005; H04R 5/033; H04R 1/406; H04R 2225/81; H04R 25/305; H04R 25/45; H04R 1/1083; H04R 2225/0216; H04R 2430/00; H04R 2460/07; H04R 25/55; H04R 25/609; H04R 1/1075; H04R 1/1091; H04R 2225/023; H04R 2225/51; H04R 2225/83; H04R 2460/01; H04R 2460/11; H04R 2460/15; H04R 25/353; H04R 25/48; H04R 25/652; H04R 25/656; H04R 3/002

USPC .......................................................... 381/312

See application file for complete search history.

(56) References Cited

U.S. PATENT DOCUMENTS

| | | | | |
|---|---|---|---|---|
| 2011/0150257 | A1* | 6/2011 | Jensen | H04R 25/453 381/318 |
| 2015/0063614 | A1 | 3/2015 | Petersen et al. | |

FOREIGN PATENT DOCUMENTS

| | | | |
|---|---|---|---|
| CN | 111065032 | | 4/2020 |
| EP | 0843427 | | 5/1998 |
| EP | 2237573 | | 10/2010 |
| EP | 2613566 | | 7/2013 |
| EP | 3002959 | | 4/2016 |
| EP | 3185586 | | 6/2017 |
| EP | 3481085 | | 5/2019 |
| EP | 4047956 | | 8/2022 |
| WO | 2014/198307 | A1 | 12/2014 |
| WO | WO 2018/177927 | | 10/2018 |
| WO | WO 2022/106196 | | 5/2022 |

* cited by examiner

DETERMINING AN ACOUSTIC CHARACTERISTIC OF A HEARING INSTRUMENT

TECHNICAL FIELD

The present disclosure relates to a hearing instrument and to a method for determining an acoustic characteristic of a hearing instrument.

BACKGROUND

Different kinds of hearing instruments are known in the art. Examples of hearing instruments include hearing aids for hearing impaired users, hearing enhancement devices for augmenting the hearing capability of normal hearing persons, as well as hearing protection devices designed to prevent noise-induced hearing loss. Hearing instruments commonly comprise an input transducer, a signal processing unit and an output transducer. During use, the input transducer provides an audio input signal responsive to sensed sound in an environment of the hearing instrument. The signal processing unit processes the audio input signal to produce a hearing instrument audio signal and the output transducer emits an acoustic output representative of the hearing instrument audio signal produced by the signal processing unit.

The acoustic output of a hearing instrument as perceived by the user depends on the hearing instrument and its environment, in particular on characteristics of a feedback path between the output transducer and the input transducer of the hearing instrument.

Feedback is a well-known problem in hearing instruments and several systems for suppression and cancellation of feedback exist within the art.

Feedback may occur along external and/or internal feedback paths. Feedback along an external feedback path includes transmission of sound between the output transducer and the input transducer of the hearing aid along a path outside the hearing instrument. This problem, which is also known as acoustical feedback, occurs e.g. when a hearing instrument mold does not completely fit the wearer's ear, or in the case of an ear mold comprising a canal or opening for e.g. ventilation purposes. In both examples, sound may "leak" from the output transducer to the microphone and thereby cause feedback.

Feedback in a hearing instrument may also occur along an internal feedback path as sound can be transmitted from the output transducer to the input transducer via a path inside the hearing instrument housing. Such transmission may be airborne or caused by mechanical vibrations in the hearing instrument housing or some of the components within the hearing instrument.

With the development of very small digital signal processing (DSP) units, it has become possible to perform advanced algorithms for feedback suppression in a tiny device such as a hearing instrument. For the purpose of providing an efficient feedback cancellation knowledge about characteristics of the hearing instruments, in particular characteristics of the feedback path is highly desirable.

To this end, it is known to perform measurements of such characteristics, in particular in situ measurements where the hearing instrument is positioned in an operational position. This typically involves the hearing instrument, or at least a component thereof, being positioned in the ear canal of a user.

Methods for measuring characteristics of a hearing instrument, such as acoustic impulse responses for feedback path identification, are known. Typically, such measurements are performed as open-loop measurements. In hearing instruments, open-loop measurements are commonly used in the initial fitting procedure to identify the feedback path from the output transducer to the input transducer. To this end, an acoustic probe signal is emitted by the output transducer, the microphone response is recorded and analyzed so as to determine the desired characteristics, e.g. by fitting a model of the feedback path to the recorded response data.

An advantage of open-loop identification over closed-loop identification is that it provides high precision and unbiased results. Closed-loop identification typically tends to be less efficient and suffers from bias when the feedback and external signals are correlated. Decorrelation techniques provide some help, but cannot achieve the same guaranteed performance as open-loop identification. A disadvantage of prior art open-loop identification is that no other sound can be played during the identification process.

It would be desirable to have a method that performs open-loop identification without disrupting the normal operation of the hearing instrument or a method that at least reduces such disruption.

It is an object of the present invention to provide a hearing instrument and to a method for determining a characteristic of a hearing instrument that overcomes or at least reduces one or more of the above disadvantages of prior art approaches and/or solves other problems of prior art solutions or that can at least serve as an alternative to prior art solutions.

SUMMARY

Disclosed herein are embodiments of a method for determining a characteristic, in particular an acoustic characteristic, of a hearing instrument, the hearing instrument including at least one input transducer operable to provide an input audio signal responsive to sensed sound in the environment of the hearing instrument, a signal processing unit and at least one output transducer, the method comprising:

- emitting an acoustic probe signal by the output transducer,
- receiving an input audio signal from the microphone,
- analyzing the received input audio signal to determine the characteristic of the hearing instrument based on an input transducer response to the emitted acoustic probe signal, wherein the method further comprises filtering the received input audio signal to selectively attenuate one or more signal components corresponding to the acoustic probe signal, and wherein emitting the acoustic probe signal comprises emitting a combined acoustic output signal comprising the acoustic probe signal and an acoustic hearing instrument signal obtained from the filtered input audio signal.

Accordingly, as the signal components corresponding to the probe signal are attenuated in, or even removed from, the input audio signal of the hearing instrument, the normal operation of the hearing instrument does not need to be disrupted for the purpose of the determination of the characteristic of the hearing instrument. The determination of the hearing instrument characteristic can nevertheless be performed substantially unaffected by the normal operation of the hearing aid.

In particular, high-quality, unbiased feedback path estimation may be achieved without the need for temporarily depriving the user from acoustic sensory input from the environment. For example, when the determination of the feedback path characteristics is performed as a part of a fitting session for adjustment of the hearing instrument, the risk that important information is missed by the user during the adjustment session is greatly reduced. Various embodiments of the method disclosed herein even allow the hearing instrument to emit the probe signal over an extended period of time, e.g. at a low of level, possibly even to the point where it can be made substantially inaudible, or at least less distracting or less annoying, to the user of the hearing instrument. An accurate determination of the characteristic may still be achieved even with lower probe signal levels, as the measurement can be extended over a longer period of time without or at least with only little perceivable disturbance of the normal operation of the hearing instrument.

For the purpose of the present description the filtering to selectively attenuate one or more signal components corresponding to the acoustic probe signal will also be referred to as probe-stop filtering.

The characteristic of the hearing instrument may be a transfer characteristic, such as a transfer function or impulse response, in particular a transfer characteristic of a feedback path between the output transducer and the input transducer of the hearing instrument.

Accordingly, analyzing the received input audio signal to determine the characteristic of the hearing instrument may include a system identification process known as such in the art. For example, the analysis may comprise computing an impulse response e.g. so as to determine filter coefficients of a filter, e.g. a linear filter, for modelling the determined impulse response.

The probe-stop filtering may be implemented in series with additional digital signal processing of the hearing instrument or as an integral part thereof. The additional signal processing may include hearing-loss compensation and/or other conventional signal processing of the hearing instrument known as such in the art. Accordingly, in some embodiments, the acoustic hearing instrument signal is obtained by said filtering and by additional signal processing of the received input audio signal.

The probe-stop filter performing the probe-stop filtering may be placed on the input side of the signal processing unit that performs the additional signal processing, on the output side of said signal processing unit, or somewhere in between. For example, some signal processing may be performed before the probe-stop filtering while other signal processing may be performed after the probe-stop filtering. Accordingly, in some embodiments, the additional signal processing is performed prior and/or subsequent to said filtering. In some embodiments, the probe-stop filter is integrated into the signal processing unit performing the additional processing.

Placing the probe-stop filter on the input side of the signal processing unit, or on the input side of some of the additional signal processing, may allow the storage requirements to be reduced by sharing the periodic summation buffer with the filter, and potential interactions with other algorithms are minimized.

Placing the probe-stop filter on the output side of the signal processing unit, or on the output side of some of the additional signal processing, potentially aids other identification methods that may run concurrently, e.g. fast adaptive feedback cancellation. Moreover, placing the probe-stop filter on the output side of the signal processing unit, or of at least some of the signal processing, may ensure the cleanest possible probe signal regardless of other, possibly non-linear, processing options implemented by the signal processing unit. Also, this placement requires only a single probe-stop filter instance regardless of the number of input transducers.

The signal components corresponding to the acoustic probe signal may be frequency components, in particular one or more predominant frequency components, of the probe signal. In some embodiments, the probe signal has a frequency spectrum only including a set of discrete probe frequencies, thus facilitating a selective attenuation of one or more signal components corresponding to the acoustic probe signal. To this end, the filtering may comprise selectively attenuating frequency components at said discrete and spaced apart probe frequencies. In particular, the filtering may divide the audio spectrum into a set of pass bands separated by notches at the probe frequency. Moreover, this type of probe signal has been found to facilitate an accurate determination of a characteristic of a hearing instrument, in particular an accurate characterization of the feedback path.

In particular, in some embodiments, the probe signal is a pseudo-random sequence of sound samples that is repeated after a predetermined number, L, of samples. Preferably, the probe signal implements a maximum length sequence (MLS).

In some embodiments, the filtering is performed by a comb filter, in particular a recursive comb filter, or by another suitable filter for selectively blocking a plurality of frequencies or narrow frequency bands. Such a filtering may by implemented by a polyphase decomposition of the signal into L phases, where each phase is independently filtered with the same prototype response, thus realizing a frequency response that repeats the prototype response shape L times. A first order prototype response shape has been found to provide an efficient and effective implementation, but it will be appreciated that second—or even higher—order implementations may be used as well.

In some embodiments, the filter is an adaptive filter, in particular a filter including a gain that depends on the signal-level, thus providing improved echo cancellation and suppression of undesired reflections for a variety of sound environments and types of probe signals.

In some embodiments, the filter defines a plurality of notches at the probe frequencies, each notch having a width, i.e. the filter attenuates frequencies within a specific, narrow range around each probe frequency, while passing all other frequencies, preferably substantially unaltered or with little alteration. In some embodiments, the width of the notches may be predetermined. In other embodiments, when the filter is an adaptive filter, it may be configured to adjust the width of the notches adaptively, e.g. responsive to changes in the signal level of the received input audio signal. To this end, the adaptive filter may include a level-dependent gain or it may otherwise adaptively control the notch bandwidth. In one embodiment, the adaptive filter includes a first and a second level tracker, wherein the first level tracker is configured to track the input audio signal at a first rate, and the second level tracker is configured to track the input audio signal at a second rate, slower than the first rate. For stationary conditions, i.e. when levels tracked by the two level trackers are substantially equal, a baseline value for the level-dependent gain may be used or the notch width may be controlled to have a baseline width in another manner. The baseline bandwidth may be selected small enough for the reflections to be sufficiently masked by the received audio signal, while still allowing sufficient decay of the response tail and flexibility to adapt to changes in the feedback path. Changes relative to the baseline bandwidth may be made proportional to a difference between the fast and slow level estimates. When there is a sudden drop in signal level, indicating that a previously masked long reflection tail could become noticeable, the gain may be temporarily increased or the notches may otherwise be caused to temporarily become wider. When there is a sudden increase in signal level, which could become noticeable as an echo, the level-dependent gain may temporarily be decreased, which results in narrower notches, or the notch bandwidth may otherwise be temporarily decreased.

In some embodiments, the bandwidth of the notches may be uniform across all probe frequencies. To this end, the gain may be a scalar gain. In other embodiments, the notch bandwidth may be made frequency dependent, e.g. by implementing a gain as a linear phase FIR filter.

The present disclosure relates to different aspects including the method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of a hearing instrument, comprising:

- at least one input transducer operable to provide an input audio signal responsive to sensing sound in the environment of the hearing instrument,
- a signal processing unit,
- at least one output transducer,
- a signal generator for generating a probe signal configured to cause the output transducer to emit an acoustic probe signal,
- a response analyzing circuit configured to analyze the input audio signal from the input transducer to determine the characteristic of the hearing instrument based on an input transducer response to the emitted acoustic probe signal, wherein the hearing instrument further comprises:

- a probe-stop filter configured to filter the received input audio signal to selectively attenuate one or more signal components corresponding to the acoustic probe signal, and
- a combiner configured to combine the probe signal and a hearing instrument signal obtained from the filtered input audio signal, and to feed the combined signal to the output transducer for emission of a combined acoustic signal.

For the purpose of the present description, the terms “signal processing unit” and “response analyzing circuit” comprise any suitably configured circuitry or device configured to perform the processing described herein to be performed by the respective processing units. For example, the signal processing unit and/or the response analyzing circuit may be or comprise an ASIC processor, a FPGA processor, a suitably programmed general-purpose processor, a microprocessor, a circuit component, or an integrated circuit.

The hearing instrument may be a hearing aid for hearing impaired users, a hearing enhancement device for augmenting the hearing capability of normal hearing persons, a hearing protection device for preventing noise-induced hearing loss, or the like. For example, the hearing instrument may be, or comprise a BTE, RIE, ITE, ITC, CIC, etc. type of hearing instrument.

DETAILED DESCRIPTION

Figure 1:
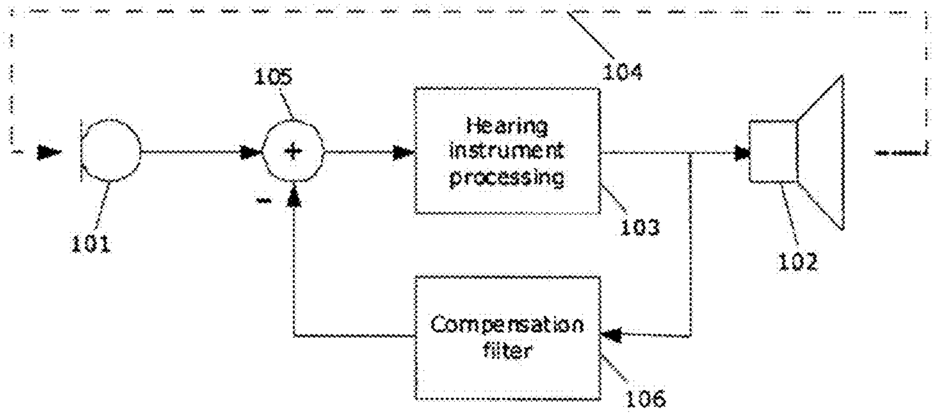
FIG. 1 schematically shows a block diagram of an example of a hearing instrument.

FIG. 1 schematically shows a block diagram of an example of a hearing instrument, such as a hearing aid. The hearing instrument comprises an input transducer 101, such as one or more microphones, a signal processing unit 103, and an output transducer 102, such as a loudspeaker, also referred to as a receiver, an implanted transducer, etc. The input transducer 101 receives incoming sound and converts it into an audio signal. Signal processing unit processes the audio signal and outputs a hearing instrument signal which is fed into the output transducer 102. In particular, the signal processing unit 103 may process the audio signal so as to compensate a hearing loss of a user of the hearing aid, i.e. the hearing instrument signal may be a hearing loss compensated audio signal adapted to restore loudness of the sound emitted by the receiver to a loudness of the incoming sound as it would have been perceived by a normal listener. Thus, the hearing instrument processor 103 comprises elements such as amplifiers, compressors and noise reduction systems etc. The output transducer 102 is configured to output an acoustic output signal based on the hearing instrument signal, where the acoustic output signal can be received by the human auditory system, whereby the user hears the sound.

A feedback path 104 is shown as a dashed line between the output transducer 102 and the input transducer 101. This feedback may cause the input transducer 101 to pick up sound from the output transducer 102, which may lead to well-known feedback problems, such as whistling.

In order to compensate for feedback, some hearing instruments include a feedback compensation filter 106, which may be configured to feed a compensation signal to a subtraction unit 105, whereby the compensation signal is subtracted from the audio signal provided by the input transducer 101 prior to processing in the signal processing unit 103. When the characteristics of the feedback path 104 are known or can accurately be determined, the filter characteristics of the compensation filter 106 can be selected or controlled such that the feedback path can be compensated for.

Accordingly, for the above and/or for other purposes, it may be desirable to determine a characteristic of a feedback path of a hearing instrument or another characteristic of a hearing instrument. The characteristic of the hearing instrument may be indicative of an acoustic characteristic of the hearing instrument when positioned in an operational configuration relative to the user's head, in particular when at least a part of the hearing instrument is positioned in the user's ear canal. The acoustic characteristic may thus include characteristics of the acoustical circumstances around the hearing instrument, e.g. the acoustical characteristics of the ear canal of the user, e.g. how well a mold of the hearing instruments fits into the ear canal. Moreover, such characteristics may vary over time. Therefore, it is desirable to perform a determination of the characteristic of the hearing instrument in situ, i.e. when the hearing instrument or at least a component of the hearing instrument is positioned in an operational position, e.g. with at least one component of the hearing instrument positioned in an ear canal of a user.

Figure 2:
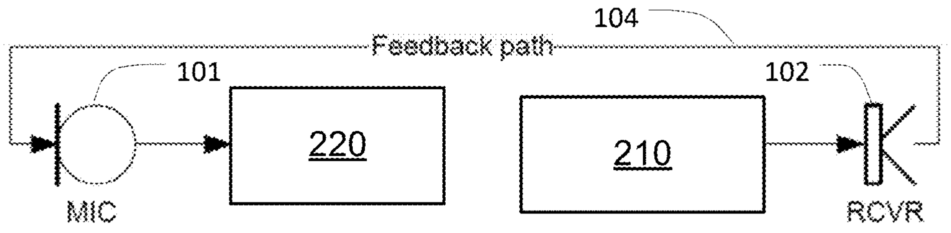
FIG. 2 schematically illustrates an open-loop measurement of a characteristic of a hearing instrument.

FIG. 2 schematically illustrates an open-loop measurement of a characteristic of a hearing instrument, e.g. of a hearing instrument as described in connection with FIG. 1. In an open loop measurement, the normal signal processing path between the input transducer 101 and the output transducer 102 is interrupted. Instead, a probe signal generator 210 generates a probe signal and feeds the probe signal into the output transducer 102. The probe signal is configured to cause the output transducer 102 to emit an acoustic probe signal. A signal analyzer circuit 220 analyzes the input audio signal from the input transducer 101 to determine the characteristic of the hearing instrument based on the input transducer response to the emitted acoustic probe signal.

Figure 3:
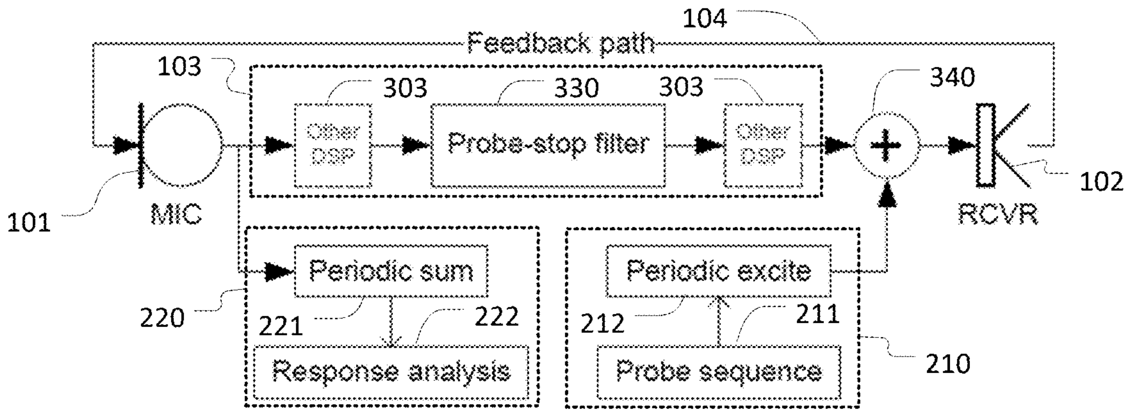
FIG. 3 schematically illustrates an embodiment of a hearing instrument as described herein.

FIG. 3 schematically illustrates an embodiment of a hearing instrument. The hearing instrument comprises an input transducer 101, one or more signal processing units 103, and an output transducer 102, all as described in connection with FIG. 1. The hearing instrument may include further components, such as a feedback compensation filter as described in connection with FIG. 1 and/or other components.

The hearing instrument further includes a signal generator 210 and a response analyzing circuit 220 configured to determine a characteristic of the hearing instrument, e.g. as described in connection with FIG. 2. The signal generator 210 and/or the response analyzing circuit 220 may be implemented separate from the signal processing unit 103 or partly or completely integrated with the signal processing unit 103 into a single processing unit. The hearing instrument of FIG. 3 differs from the hearing instrument of FIG. 2 in that the determination of the characteristic of the hearing instrument is performed without disrupting the normal operation of the hearing instrument and without significantly affecting the normal operation of the hearing instrument.

To this end, the hearing instrument comprises a probe-stop filter 330 configured to filter the received input audio signal to selectively attenuate one or more signal components corresponding to the acoustic probe signal. The probe-stop filter is selective in that it blocks or at least attenuates the signal components corresponding to the acoustic probe signal, while preferably not, or only to a low degree, affecting the remaining signal components.

In the embodiment of FIG. 3, the probe-stop filter 330 is shown as a part of the signal processing unit 103. It will be appreciated, however, that the probe-stop filter may also be implemented separate from the signal processing unit 103. Generally, some or all of the additional signal processing may be implemented prior to the probe-stop filtering. Similarly, some or all of the additional signal processing may be implemented subsequent to the probe-stop filtering. This is schematically illustrated in FIG. 3 by the dashed blocks 303 representing additional signal processing other than the probe-stop filtering. It will be appreciated that some embodiments may only include such additional signal processing at the input side of the probe-stop filtering, while other embodiments may only include such additional signal processing at the output side of the probe-stop filtering 330. Yet other embodiments may include some additional signal processing at the input side and other additional signal processing at the output side of the probe-stop filtering. Examples of the additional signal processing 303 may include hearing loss compensation, feedback compensation and/or the like. The signal processing unit 103 thus outputs a hearing instrument signal, e.g. a hearing-loss compensated signal, where the signal components that correspond to the probe signal have been attenuated.

Accordingly, the probe-stop filter 330 can generally be implemented in series with the other digital signal processing 303, which may include all the usual hearing instrument algorithms, and may be placed on the input side, output side, or somewhere in the middle. Either position has advantages and disadvantages. E.g., on the input side storage requirements may be reduced by sharing the periodic summation buffer with the filter, and potential interactions with other algorithms are minimized. Removing the probe frequencies later potentially aids other identification methods that may run concurrently (e.g., it may help for fast adaptive feedback cancellation). Removing the probe frequencies on the output side, just before adding the probe signal, ensures the cleanest possible identification signal at the probe frequencies, regardless of other (possibly non-linear) processing options, and requires only a single probe-stop filter instance regardless of the number of microphones.

The hearing instrument further comprises a combiner 340 configured to combine the probe signal from signal generator 210 with the output from the signal processing unit 103 including the probe-stop filter 330, i.e. to combine the probe signal and a hearing instrument signal obtained from the filtered input audio signal. The combiner 340 feeds the combined signal to the output transducer 102 for emission of a corresponding combined acoustic output signal.

The probe signal generator 210 may include a periodic excitation circuit 212 that generates the probe signal as a pseudo-random sequence 211 that repeats every L samples. Accordingly, the response analyzing circuit 220 may include a periodic summing circuit 221 configured for recording the input transducer response by periodic averaging in a buffer of length L and to feed the buffer contents into a response analyzer 222. The response analyzer may perform a system identification process to determine a characteristic of the hearing instrument, e.g. to determine an impulse response, e.g. as described in James M. Kates, "Room reverberation effects in hearing aid feedback cancellation" The Journal of the Acoustical Society of America 109, 367 (2001); doi:

10.1121/1.1332379, or by another suitable process for system identification known as such in the art.

Unlike ordinary signals, the spectrum of such a periodic sequence contains only the discrete frequencies $$f(n) = \frac{2\pi}{L} n \quad 0 \le n \le L/2 \tag{1}$$

where n is an integer and L is the length of the sequence, expressed in number of signal samples. Generally, sampling a discrete number of frequencies provides a good approximation when the true transfer function is sufficiently smooth, which is the case when the true impulse response dies out sufficiently within L samples. In some hearing instruments, the probe sequence used to calibrate the digital feedback suppression system is a Maximum Length Sequence (MLS), e.g. as described in D. Rife and J. Vanderkooy: "Transfer-Function Measurement with Maximum-Length Sequences", Journal of the Audio Engineering Society, 37 (6):419{444, June 1989. In some embodiments, the maximum-length sequence has a period of 24.5 ms. MLS methods may employ efficient cross correlations between input and output to recover the periodic impulse response (PIR) of the system being measured.

The probe sequence may have a minimal crest factor and flat spectrum, which eases decoding. Alternatively, the sequence may be shaped, e.g., to improve sensitivity in certain frequencies, or make it less noticeable.

The discrete nature of the probe spectrum can be exploited by various embodiments of the probe-stop filter disclosed herein so as to minimize disruption caused by open-loop identification. Instead of disconnecting all sound in the forward path between input transducer and output transducer it is enough to stop only the discrete probe frequencies. Frequencies between the probe frequencies (corresponding to non-integer values of n in eq. 1) may be allowed to pass through without significantly affecting the measurement.

To this end, the probe-stop filter 330 may divide the spectrum into L/2 unique bands separated by notches at the probe frequencies f(n). For non-probe frequencies, audible changes to the signal by the probe-stop filter should be minimized.

In the following, various embodiments of the probe-stop filter 330 will be described in more detail.

Figure 4:
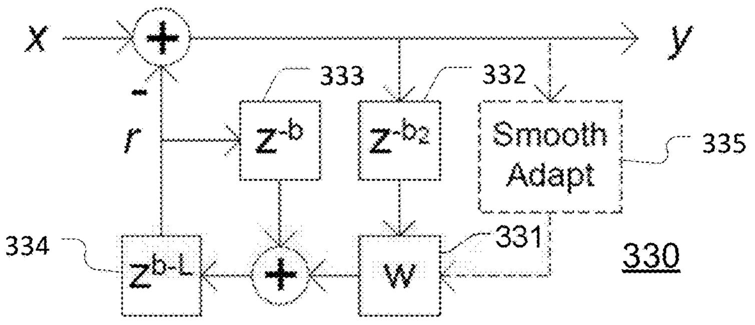
FIG. 4 schematically illustrates an example of a probe-stop filter of an embodiment of a hearing instrument as described herein.

FIG. 4 schematically illustrates an example of a probe-stop filter of an embodiment of a hearing instrument as described herein. In particular, the probe-stop filter 330 of FIG. 4 is implemented as a recursive comb filter, which has been found to provide a highly efficient implementation of the probe-stop filter.

The filter comprises a gain block 331 applying a gain w to a delayed signal, delayed by delay block 332 implementing a delay b2. The filter further comprises delay blocks 333 and 334 applying delays b and L-b, respectively. Optionally, the filter further comprises a gain adaptation block 335. Different filter characteristics can be obtained by selecting the delays b and b2, by choosing the gain w and/or by adding or omitting the gain adaptation block 335.

Generally, the filter 330 provides full suppression at the probe frequencies, regardless of the setting for w. In some embodiments of the filter 330, the delay parameters b and b2 are selected equal to each other. In particular, in some embodiments they are both set to zero.

In one particular embodiment, the delay parameters b and b2 are set to zero, the gain adaptation block 335 is omitted, and w is a constant scalar gain, e.g. in the range between 0 and 2, that defines the transient behavior around the probe frequencies.

Figure 5A:
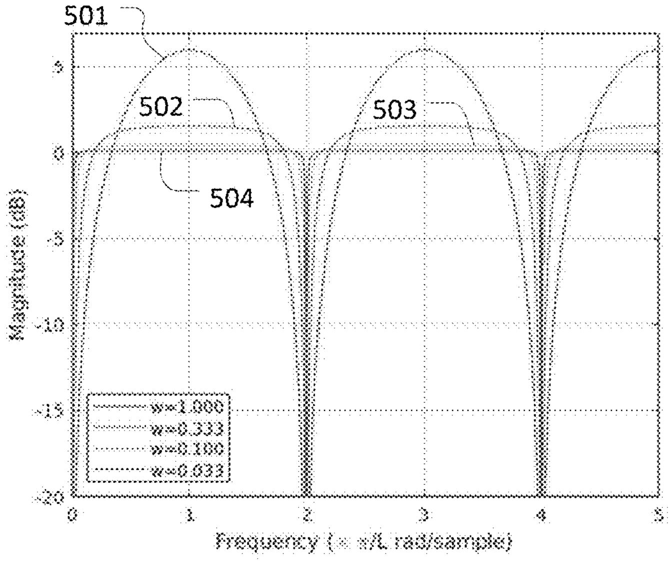
FIGS. 5A and 5B illustrate probe-stop magnitude responses of the filter of FIG. 4.
Figure 5B:
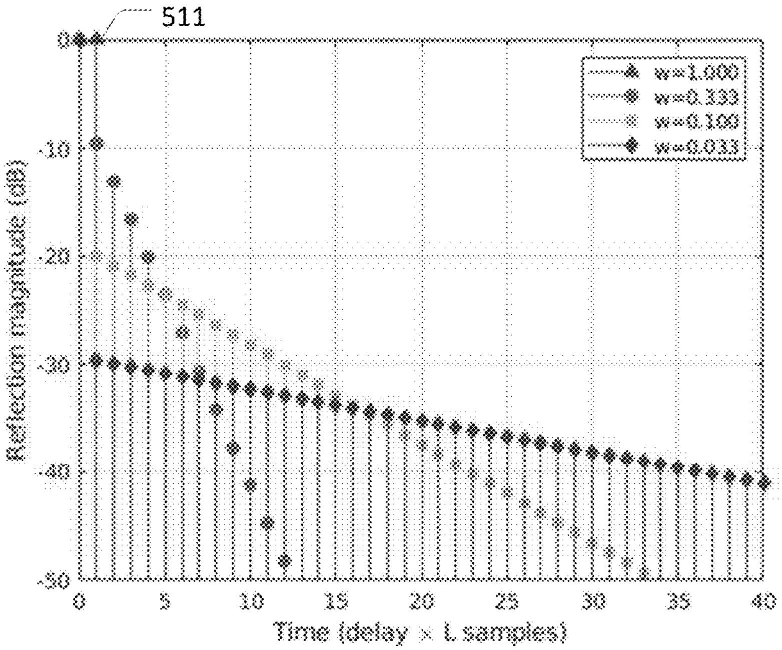

FIGS. 5A and 5B illustrate probe-stop magnitude responses of the filter of FIG. 4 for different fixed scalar values of w and for b and b2 set to zero.

In particular, FIG. 5A illustrates the magnitude responses in the frequency domain. Curve 501 illustrates the magnitude response for w=1, curve 502 illustrates the magnitude response for w=0.333, curve 503 illustrates the magnitude response for w=0.1, and curve 504 illustrates the magnitude response for w=0.033.

FIG. 5B illustrates the reflection magnitudes of the probe stop filter in time domain for the same values of w.

As can be seen from FIGS. 5A and 5B, the magnitude response of the probe-stop filter has notches at the probe frequencies defined in eqn. (1). Small values of w provide narrow notches with a long tail of many small reflections at multiples of L samples delay. Larger values of w provide wider notches with fewer large reflections. For w=1, the response is a special case, with just a single (non-attenuated) reflection at L samples delay, as illustrated by triangular dot 511 in FIG. 5B.

As shown in FIG. 5A, for large values of w, the filter may add some significant gain in the center of the pass bands, e.g. as shown by curves 501 and, to some extent, also curve 502. The maximum filter gain may be normalized by multiplying with (1−w/2), the RMS filter gain may be normalized by multiplying with $\sqrt{1-w/2}$; alternatively the offset may simply be discarded when it is small enough.

As illustrated by FIG. 5B, selecting a value for w may involve a trade-off between either a smaller number of larger reflections or a larger number of smaller reflections. Ideally, the reflections are all hidden by forward temporal masking, precedence effects, and ordinary masking by the direct signal. For the first two psychoacoustic effects to work, the delay should preferably roughly be in the range of 5 to 40 ms, and subsequent decay should be sufficiently fast to not cause noticeable ringing effects (e.g., after 40 ms seconds reflections may become noticeable as echoes). Consequently, for modest values of L, it is possible to select a fixed scalar gain w where perceived effects of both the first reflections and the late response tail are sufficiently minimized. Of course, the effect can still be demonstrated for artificial test signals, such as a pure tone at a probe frequency, but even then the effect is simply a gradual fade-out which is unlikely to be considered objectionable. As L gets larger, at some point, for some sounds, either the first reflection or the long response tail may become noticeable or even objectionable. For some sounds, a small value of w is better, while for other sounds a larger value is better. To get the best of both worlds, and reduce undesired side effects for a wide range of signal types, an adaptive filter implementation may thus be preferred.

Again referring to FIG. 4, in one embodiment, the probe-stop filter includes a gain adaptation circuit 335 so as to provide an adaptive, scalar gain w, which is updated by tracking the level of the main audio signal. In one embodiment, the gain adaptation circuit may use two level trackers, one running at a fast rate and the other at a slow rate, slower than the fast rate. For stationary conditions, i.e. when both level trackers are in agreement, the gain adaptation circuit may set w to a predetermined baseline value. The baseline value may be selected small enough for the reflections to be sufficiently masked by the main audio signal, while still allowing sufficient decay of the response tail and flexibility to adapt to changes in the feedback path. The gain adaptation circuit 335 may adjust w to deviate from the baseline value, when the fast and slow level estimates differ from each other. For example, the gain adaptation circuit 335 may adjust w to deviate from the baseline value by a difference that is proportional to a difference between the slow and fast level estimates. Accordingly, when there is a sudden drop in signal level, indicating that a previously masked long reflection tail could become noticeable, w is temporarily increased (notches become wider). When there is a sudden increase in signal level, which could become noticeable as an echo, w is temporarily decreased (notches become narrower). The effect of this adaptation is to reduce the dynamic range of the update signal feeding into the filter buffer, thus continuously adapting between forms of compression/limiting and expansion.

To avoid noticeable non-linear effects, introduced by adapting w, changes to w may be done proactively and/or smooth, i.e., it may be preferred to arrive at a new gain early, and get there by applying many small steps at the sampling rate instead of a few big steps at the block rate. To this end, in order to obtain a smooth transition, the gain adaptation circuit 335 may calculate a new target for w every block, using input from the level trackers that may also run at block rate. From the calculated target for w, the gain adaptation circuit 335 may then derive a relative increment to be added every sample. Gain changes may be made proactively by setting a positive value for b and b2, allowing the filter response to adapt one or more blocks ahead of time, which is particularly useful to avoid echoes from impulsive sounds.

Listening experiments by the inventor using a wide range of audio fragments indicate that a scalar adaptive gain w performs well for typical values of Z suitable for digital feedback suppression. For example, L may be between 100 and 2000; when using a maximum length sequence Z may be selected to be $L=2^m-1$, where m may be between 7 and 12, though other values may also be used. The value of L may e.g. be selected based on the desired resolution, sampling rate, and/or other factors. Deterioration of speech quality, e.g., from fundamental or harmonic frequencies coinciding with notch frequencies, was not observed. Most likely this is because average speech harmonics spread much wider than the notches used to suppress the probe frequencies, and when this is temporarily not the case because the level is dropping fast, and notches are temporarily widened, forward masking effects are taking over. Some changes may be noticeable for signals with highly concentrated spectral content, like the sound of an ambulance/siren where the frequency is slowly shifting while keeping the amplitude constant. In general, however, if at all noticeable, most changes of sound are like a minor increase in room reverberation.

Non-adaptive probe-stop filter configurations may not always be able to provide the same performance as adaptive configurations, but may still be of some use for small values of L. When L is further increased, eventually a point may be reached where even a scalar adaptive gain no longer suffices. When this happens, some further improvement can be obtained by switching to a frequency-dependent gain. This can be done by implementing the gain w with a linear phase FIR filter, for which the group delay is compensated by lowering b2, e.g. such that the combined delay still matches b. Such a filter can be designed/updated by spectral analysis of the levels and target gain calculation per band, followed by a windowed IFFT filter design. Alternatively, the calculations may be performed entirely in the time domain using a linear phase bandsplit, which is efficient when the desired number of bands is low, or entirely in the frequency domain, which is efficient when the desired number of bands is high.

Figure 6:
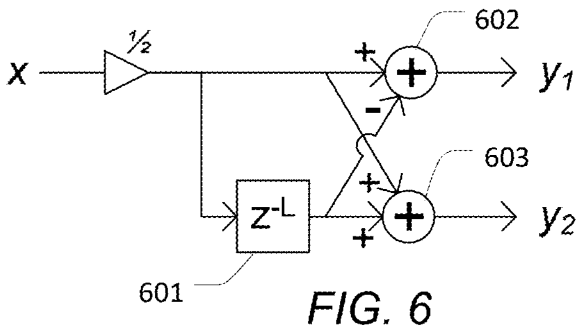
FIG. 6 schematically illustrates another example of a probe-stop filter of an embodiment of a hearing instrument as described herein.

FIG. 6 schematically illustrates another example of a probe-stop filter of an embodiment of a hearing instrument as described herein. In this example, the probe-stop filter is a comb bandsplit filter. In particular, the comb bandsplit filter includes a delay block 601 providing an L-sample delay to the input audio signal x. The delayed signal is subtracted from the input audio signal x by combiner 602 to provide a first response signal y1. Optionally, the filter includes a further combiner 603 which adds the delayed signal to the input audio signal x to provide a second response signal y2.

Response characteristics of the comb bandsplit filter are illustrated in FIGS. 7A-D.

Figure 7A:
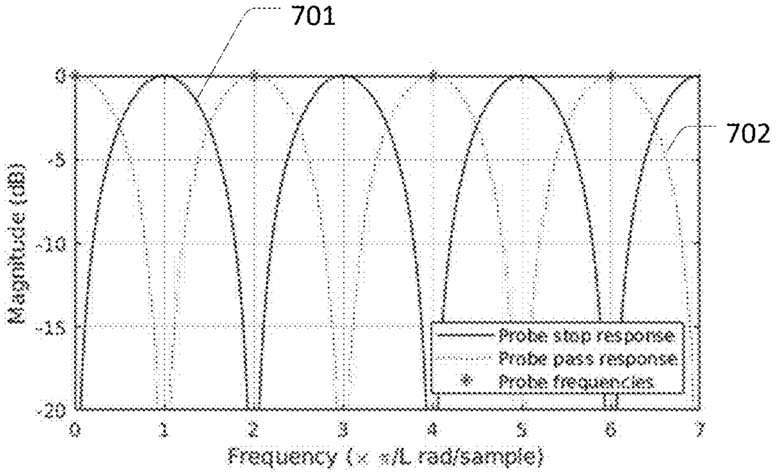
FIGS. 7A-D illustrate response characteristics of the probe-stop filter of FIG. 6.
Figure 7B:
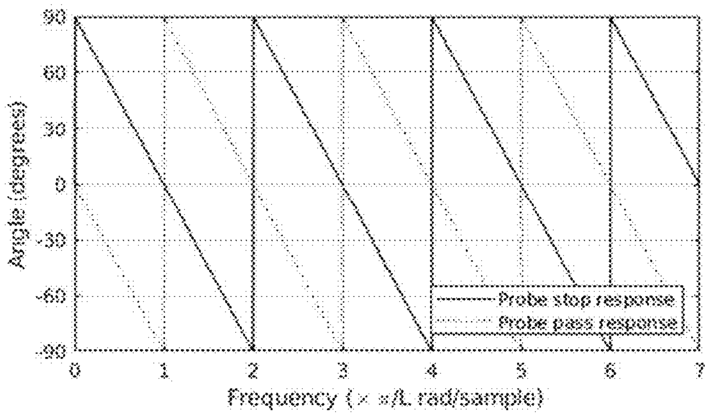
Figure 7C:
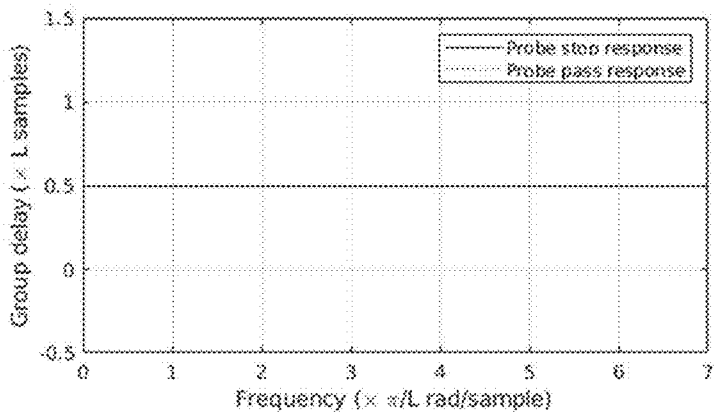
Figure 7D:
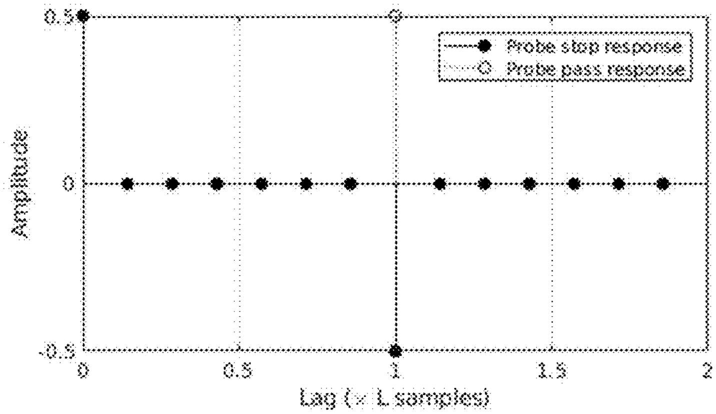

As can be seen from FIG. 7A, which illustrates the magnitude response 701 of the response signal y1 and the magnitude response 702 of the response signal y2, the response signal y1 has notches at the probe frequencies of the probe signal and broad peaks between the probe frequencies. Conversely, the response signal y2 has notches between the probe frequencies of the probe signal and broad peak at the probe frequencies. The response signal y1 may thus be referred to as a probe-stop response signal and serve as filtered signal to be forwarded to the output transducer, optionally subject to additional signal processing as described herein. The response signal y2 may be referred to as a probe-pass response signal. If desired, it may be used for an analysis of the input audio signal x at the probe frequencies; alternatively, it may simply be discarded.

Figure 8:
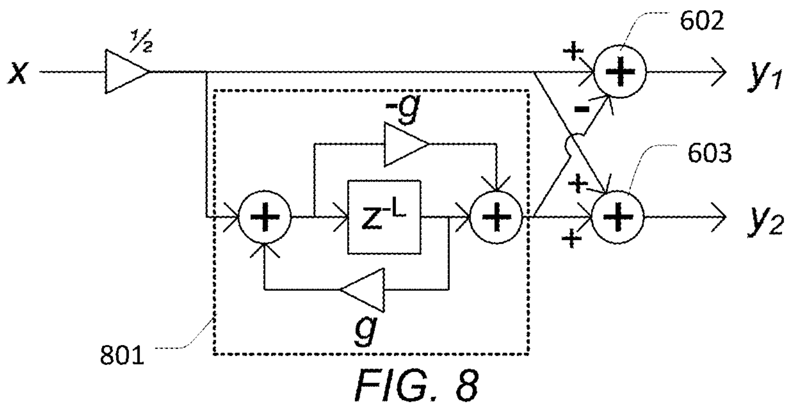
FIG. 8 schematically illustrates yet another example of a probe-stop filter of an embodiment of a hearing instrument as described herein.
Figure 9A:
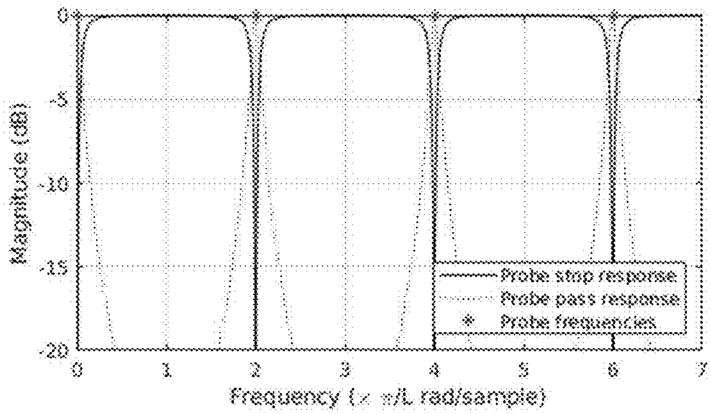
FIGS. 9A-D illustrate response characteristics of the probe-stop filter of FIG. 8.
Figure 9B:
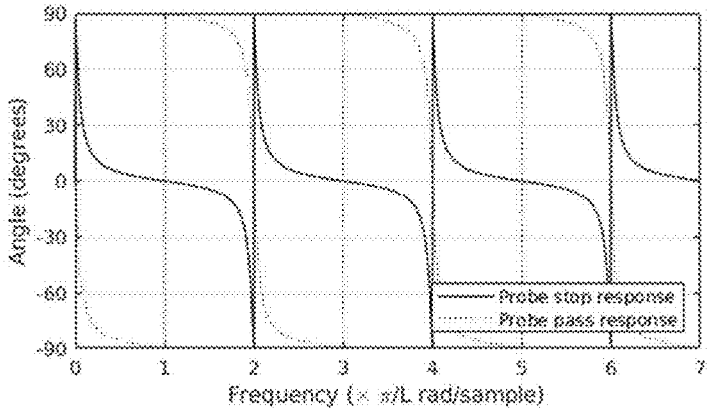
Figure 9C:
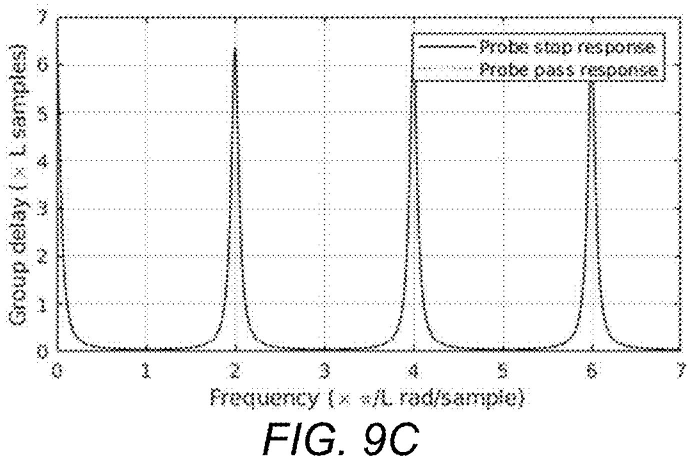
Figure 9D:
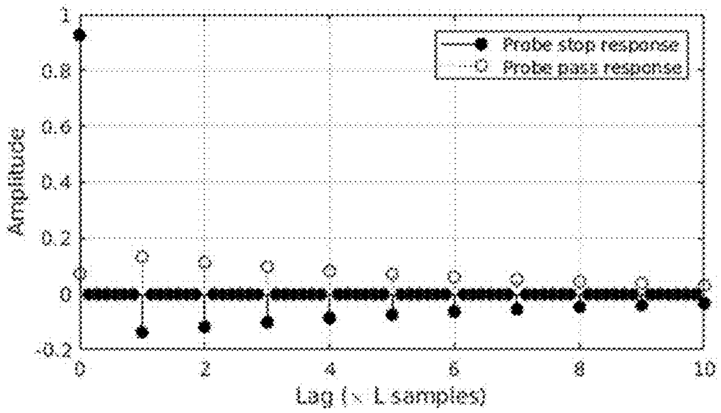

FIG. 8 schematically illustrates yet another example of a probe-stop filter of an embodiment of a hearing instrument as described herein. The filter of FIG. 8 is a Schroeder all-pass bandsplit filter, which is similar to the filter of FIG. 6, except that the L-sample delay block is replaced by a Schroeder all-pass filter 801. Response characteristics of the Schroeder all-pass bandsplit filter are illustrated in FIGS. 9A-D.

Figure 10:
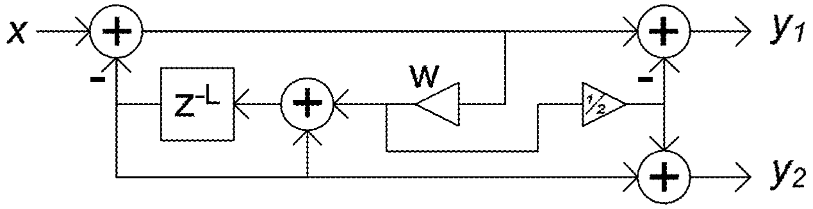
FIG. 10 schematically illustrates yet another example of a probe-stop filter of an embodiment of a hearing instrument as described herein.

FIG. 10 schematically illustrates yet another example of a probe-stop filter of an embodiment of a hearing instrument as described herein. The filter of FIG. 10 is an optimized variant of the Schroeder all-pass bandsplit filter.

Its response signals y1 and y2 may be expressed as follows:

$$y_1[n]=(1-w/2)\times(x[n]-x[n-L])+(1-w)\times y_1[n-L]$$

$$y_2[n]=(w/2)\times(x[n]+x[n-L])+(1-w)\times y_2[n-L].$$

Figure 11:
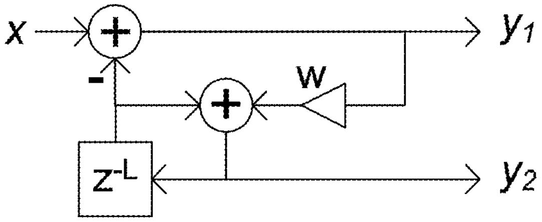
FIG. 11 schematically illustrates yet another example of a probe-stop filter of an embodiment of a hearing instrument as described herein.
Figure 12A:
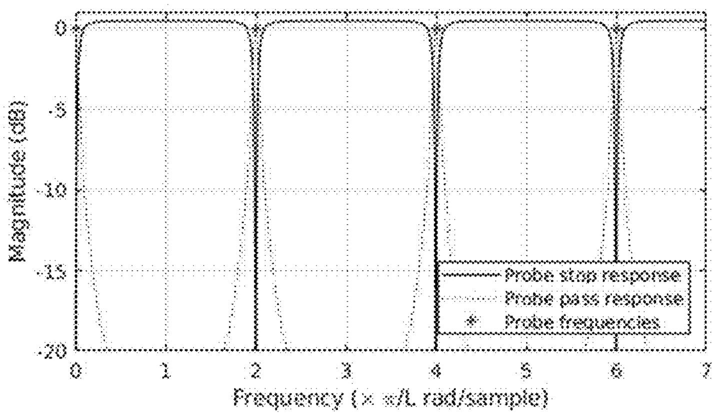
FIGS. 12A-D illustrate response characteristics of the probe-stop filter of FIG. 11.
Figure 12B:
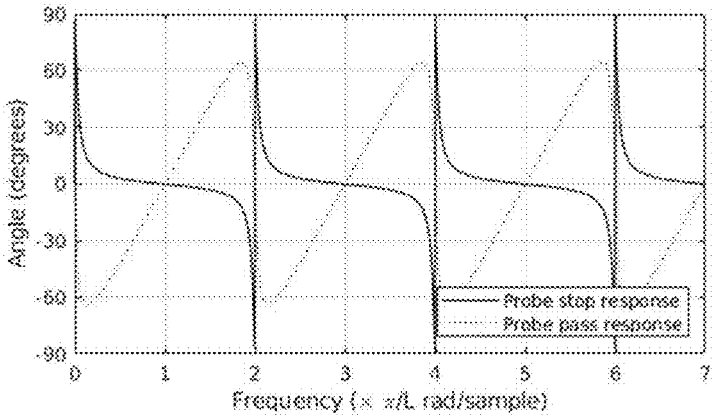
Figure 12C:
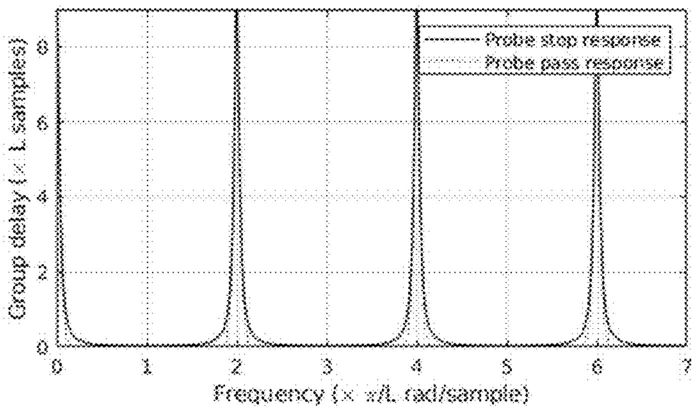
Figure 12D:
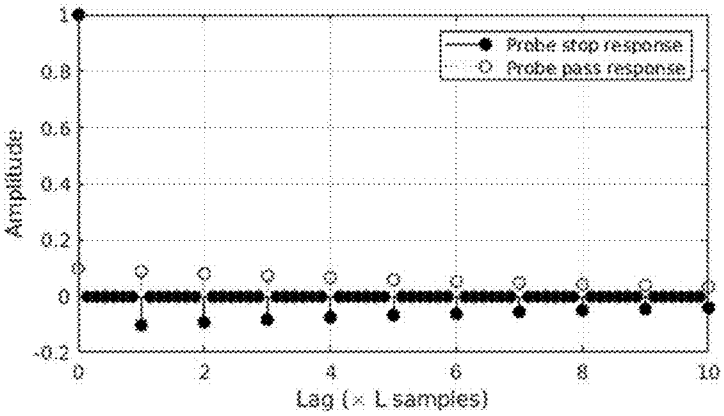

FIG. 11 schematically illustrates yet another example of a probe-stop filter of an embodiment of a hearing instrument as described herein. The filter of FIG. 11 is a simplified variant of the filter of FIG. 10 wherein normalization and 2-point moving averaging have been omitted.

The response signals y1 and y2 of this variant may be expressed as follows:

$$y_1[n]=x[n]-x[n-L]+(1-w)\times y_1[n-L]$$

$$y_2[n]=w\times x[n]+(1-w)\times y_2[n-L].$$

Response characteristics of the variant of FIG. 11 are illustrated in FIGS. 12A-D.

Figure 13:
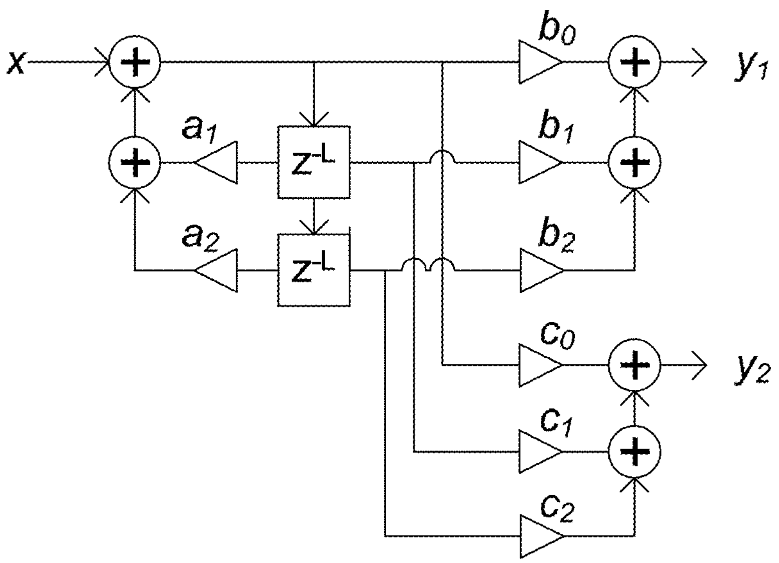
FIGS. 13-15 illustrate yet further examples of a probe-stop filter of an embodiment of a hearing instrument as described herein.
Figure 14:
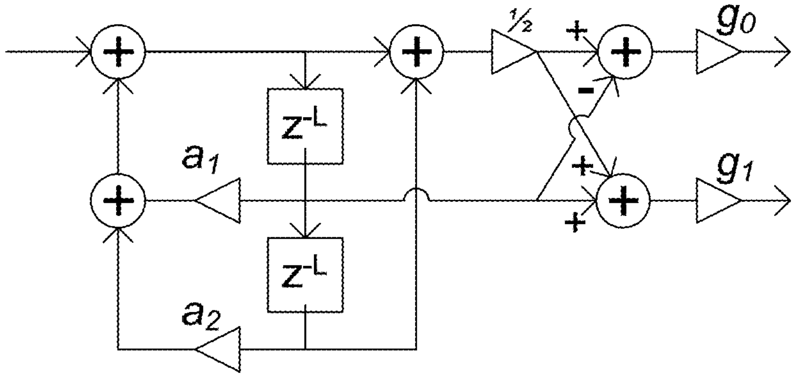
Figure 15:
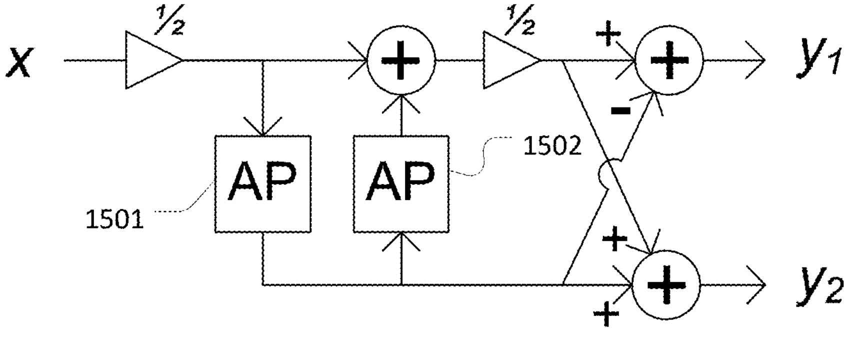

FIGS. 13-15 illustrate yet further examples of a probe-stop filter of an embodiment of a hearing instrument as described herein. The examples of FIGS. 13-15 are second order variants of probe stop-filter. In particular, FIG. 13 shows a $2^{nd}$ order bandsplit filter, FIG. 14 shows an optimized variant of a $2^{nd}$ order bandsplit filter and FIG. 15 shows a $2^{nd}$ order all-pass bandsplit filter including Schroder all-pass sections 1501 and 1502.

Figure 16A:
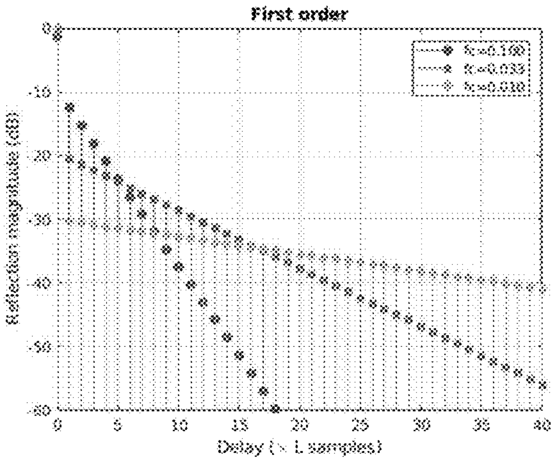
FIGS. 16A-D show response characteristics of a first order variant with second order variants and different Q factors.
Figure 16B:
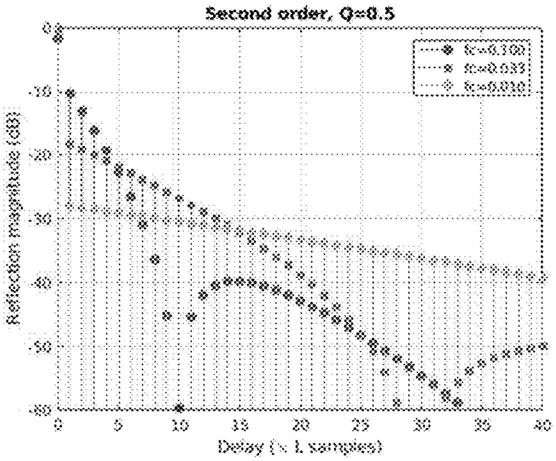
Figure 16C:
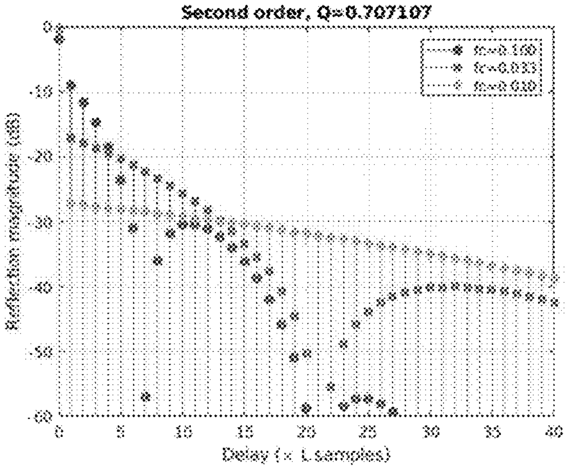
Figure 16D:
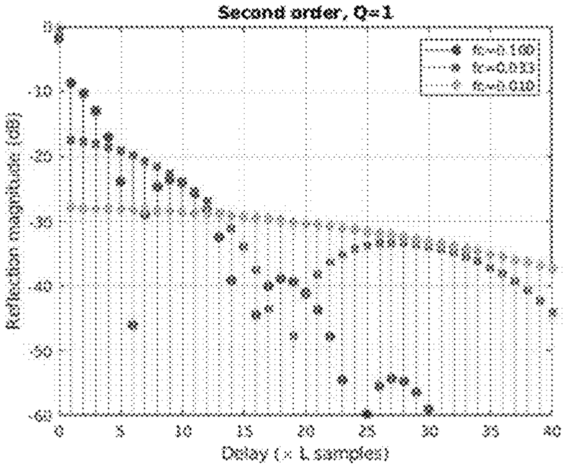

FIGS. 16A-D show response characteristics of a first order variant (FIG. 16A) with second order variants and different Q factors and cut-off frequencies (FIGS. 16B-D). While the echoes for the first-order filter decrease linearly on a dB scale, the echoes of the second-order filters decrease fast but then increase again. The cut-off frequency defining the width of the notches affects how fast the echoes decay. For wide notches, the initial echoes are stronger, but they decay faster than is the case for narrow notches.

In summary, at least some aspects disclosed herein may be summarized as follows:

Embodiment 1: A method for determining a characteristic of a hearing instrument, the hearing instrument including at least one input transducer operable to provide an input audio signal responsive to sensing sound in the environment of the hearing instrument, a signal processing unit and at least one output transducer, the method comprising:

emitting an acoustic probe signal by the output transducer, receiving an input audio signal from the microphone, analyzing the received input audio signal to determine the characteristic of the hearing instrument based on an input transducer response to the emitted acoustic probe signal, wherein the method further comprises filtering the received input audio signal to selectively attenuate one or more signal components corresponding to the acoustic probe signal and wherein emitting the acoustic probe signal comprises emitting a combined acoustic output signal comprising the acoustic probe signal and an acoustic hearing instrument signal obtained from the filtered input audio signal.

Embodiment 2: The method according to embodiment 1, wherein the acoustic hearing instrument signal is obtained by said filtering and by additional signal processing of the received input audio signal.

Embodiment 3: The method according to embodiment 2, wherein the additional signal processing is performed prior and/or subsequent to said filtering.

Embodiment 4: The method according to any one of the preceding embodiments, wherein the probe signal has a frequency spectrum only including a set of discrete probe frequencies.

Embodiment 5: The method according to embodiment 4, wherein filtering comprises selectively attenuating frequency components at said discrete probe frequencies.

Embodiment 6: The method according to any of embodiments 4 through 5, wherein the filtering divides the spectrum into a set of pass bands separated by notches at the probe frequencies.

Embodiment 7: The method according to any one of the preceding embodiments, wherein the probe signal is a pseudo-random sequence of sound samples that is repeated every L samples.

Embodiment 8: The method according to any one of the preceding embodiments, wherein probe signal represents a maximum length sequence.

Embodiment 9: A hearing instrument, comprising:

at least one input transducer operable to provide an input audio signal responsive to sensing sound in the environment of the hearing instrument, a signal processing unit, at least one output transducer, a signal generator for generating a probe signal configured to cause the output transducer to emit an acoustic probe signal, a response analyzing circuit configured to analyze an input audio signal from the input transducer to determine the characteristic of the hearing instrument based on an input transducer response to the emitted acoustic probe signal, wherein the hearing instrument further comprises:

a probe-stop filter configured to filter the received input audio signal to selectively attenuate one or more signal components corresponding to the acoustic probe signal, and a combiner configured to combine the probe signal and a hearing instrument signal obtained from the filtered input audio signal, and to feed the combined signal to the output transducer for emission of a combined acoustic signal.

Embodiment 10: The hearing instrument according to embodiment 9, wherein the probe-stop filter comprises a comb filter.

Embodiment 11: The hearing instrument according to embodiment 10, wherein the comb filter is a recursive comb filter.

Embodiment 12: The hearing instrument according to any one of embodiments 9 through 11, wherein the probe-stop filter is a first-order filter.

Embodiment 13: The hearing instrument according to any one of embodiments 9 through 12, wherein the probe-stop filter is an adaptive filter.

Embodiment 14: The hearing instrument according to any one of embodiments 9 through 13, wherein the probe-stop filter includes a frequency-dependent gain.

Embodiment 15: The hearing instrument according to any one of embodiments 9 through 14, configured to perform the steps of the method according to any one of embodiments 1 through 8.

Although the above embodiments have mainly been described with reference to certain specific examples, various modifications thereof will be apparent to those skilled in art without departing from the spirit and scope of the invention as outlined in claims appended hereto.

The invention claimed is:

1. A method performed by a hearing instrument, the hearing instrument comprising an input transducer, a processing unit, and an output transducer, the method comprising:

emitting an acoustic probe signal by the output transducer;

providing an input audio signal by the input transducer based on the emitted acoustic probe signal; and analyzing the input audio signal by the processing unit to determine a characteristic of the hearing instrument;

wherein the method further comprises filtering the input audio signal to attenuate one or more signal components corresponding to the acoustic probe signal, and combining a hearing instrument signal with a probe signal to form a combined signal, wherein the hearing instrument signal is based on the filtered input audio signal; and wherein the acoustic probe signal has a frequency spectrum comprising a set of discrete probe frequencies.

2. The method according to claim 1, wherein the hearing instrument signal is also based on an additional signal processing of the input audio signal.

3. The method according to claim 2, wherein the additional signal processing is performed prior to the filtering.

4. The method according to claim 1, wherein the act of filtering comprises attenuating the one or more signal components at the discrete probe frequencies.

5. A method performed by a hearing instrument, the hearing instrument comprising an input transducer, a processing unit, and an output transducer, the method comprising:

emitting an acoustic probe signal by the output transducer;

providing an input audio signal by the input transducer based on the emitted acoustic probe signal; and analyzing the input audio signal by the processing unit to determine a characteristic of the hearing instrument;

wherein the method further comprises filtering the input audio signal to attenuate one or more signal components corresponding to the acoustic probe signal, and combining a hearing instrument signal with a probe signal to form a combined signal, wherein the hearing instrument signal is based on the filtered input audio signal; and wherein the hearing instrument signal is also based on an additional signal processing of the input audio signal; and wherein the additional signal processing is performed subsequent to the filtering.

6. A method performed by a hearing instrument, the hearing instrument comprising an input transducer, a processing unit, and an output transducer, the method comprising:

emitting an acoustic probe signal by the output transducer;

providing an input audio signal by the input transducer based on the emitted acoustic probe signal; and analyzing the input audio signal by the processing unit to determine a characteristic of the hearing instrument;

wherein the method further comprises filtering the input audio signal to attenuate one or more signal components corresponding to the acoustic probe signal, and combining a hearing instrument signal with a probe signal to form a combined signal, wherein the hearing instrument signal is based on the filtered input audio signal; and wherein the acoustic probe signal is a pseudo-random sequence of sound samples that is repeated every L samples.

7. The method according to claim 1, further comprising generating the probe signal by a signal generator.

8. The method according to claim 1, further comprising receiving the combined signal by the output transducer.

9. The method according to claim 1, wherein the input transducer is configured to sense sound in an environment outside the hearing instrument.

10. The method according to claim 1, wherein the processing unit comprises a signal processing unit configured to provide the hearing instrument signal, a signal generator configured to provide the probe signal, and a signal analyzer circuit configured to determine the characteristic of the hearing instrument.

11. A hearing instrument, comprising:

an output transducer configured to emit an acoustic probe signal;

an input transducer configured to provide an input audio signal;

a signal generator configured to generate a probe signal;

a signal analyzing circuit configured to analyze the input audio signal from the input transducer to determine a characteristic of the hearing instrument;

a probe-stop filter configured to filter the input audio signal to attenuate one or more signal components corresponding to the acoustic probe signal; and a combiner configured to combine a hearing instrument signal with the probe signal to obtain a combined signal, wherein the hearing instrument signal is based on the filtered input audio signal;

wherein the signal generator, the signal analyzing circuit, the probe-stop filter, and the combiner are parts of a processing unit.

12. The hearing instrument according to claim 11, wherein the probe-stop filter comprises a comb filter.

13. The hearing instrument according to claim 12, wherein the comb filter comprises a recursive comb filter.

14. The hearing instrument according to claim 11, wherein the probe-stop filter is a first-order filter.

15. The hearing instrument according to claim 11, wherein the probe-stop filter is an adaptive filter.

16. The hearing instrument according to claim 11, wherein the probe-stop filter includes a frequency-dependent gain.

17. The hearing instrument according to claim 11, wherein the hearing instrument is configured to perform an additional signal processing of the input audio signal, and wherein the hearing instrument signal is also based on the additional signal processing of the input audio signal.

18. The hearing instrument according to claim 17, wherein the hearing instrument is configured to perform the additional signal processing prior to the probe-stop filter filtering the input audio signal.

19. The hearing instrument according to claim 17, wherein the hearing instrument is configured to perform the additional signal processing subsequent to the probe-stop filter filtering the input audio signal.

20. The hearing instrument according to claim 11, wherein the output transducer is configured to receive the combined signal.

21. The hearing instrument according to claim 11, wherein the input transducer is configured to sense sound in an environment outside the hearing instrument.

22. The hearing instrument according to claim 11, wherein the input transducer is configured to provide the input audio signal based on the acoustic probe signal emitted by the output transducer.

* * * * *